(12) United States Patent
Johnson et al.

(10) Patent No.: US 10,259,507 B1
(45) Date of Patent: Apr. 16, 2019

(54) SKID PLATE AND UNDERBODY ASSEMBLY FOR USE WITH AN OFF-ROAD VEHICLE

(71) Applicant: Honda Motor Co., Ltd., Tokyo (JP)

(72) Inventors: Samira S. Johnson, Dublin, OH (US); Jason Leroy Martin, Dublin, OH (US); Robert T Wilson, III, Delaware, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/928,751

(22) Filed: Mar. 22, 2018

(51) Int. Cl.
*B62D 25/20* (2006.01)

(52) U.S. Cl.
CPC .................................. *B62D 25/2072* (2013.01)

(58) Field of Classification Search
CPC .................................................. B62D 25/2072
See application file for complete search history.

(56) References Cited

U.S. PATENT DOCUMENTS

| | | | | |
|---|---|---|---|---|
| 2,637,592 A * | 5/1953 | Karlby | ...................... | B60G 3/00 180/256 |
| 2,788,223 A * | 4/1957 | Mersheimer | ........... | B62D 21/10 280/783 |
| 3,002,782 A * | 10/1961 | Jahn | ....................... | B62D 21/10 280/781 |
| 4,146,106 A | 3/1979 | Childress | | |
| 4,462,632 A * | 7/1984 | Grassl, Sr. | ............. | B62D 21/02 296/198 |
| 4,865,378 A * | 9/1989 | Filtri | ...................... | B62D 21/14 296/193.07 |
| 4,887,862 A * | 12/1989 | Bassi | ..................... | B62D 21/10 296/204 |
| 5,062,369 A | 11/1991 | Cobden et al. | | |
| 5,533,781 A * | 7/1996 | Williams | ........... | B62D 25/2072 296/204 |
| 5,791,633 A | 8/1998 | Walker | | |
| 5,992,926 A * | 11/1999 | Christofaro | ............ | B62D 21/02 296/204 |
| 8,272,465 B2 | 9/2012 | Takeshita | | |
| 8,366,170 B2 * | 2/2013 | Glickman | ........... | B60R 13/0861 180/69.1 |
| 8,641,065 B2 * | 2/2014 | Uno | ....................... | B62D 21/11 180/65.1 |
| 9,283,838 B2 | 3/2016 | Ohashi | | |
| D769,163 S * | 10/2016 | Platto | ........................ | D12/196 |
| 9,616,940 B2 * | 4/2017 | Ito | ........................ | B60R 13/043 |
| 9,783,235 B2 | 10/2017 | Patberg et al. | | |
| 2001/0030069 A1* | 10/2001 | Misu | ....................... | B60K 1/04 180/68.1 |
| 2002/0067053 A1* | 6/2002 | Wolkersdorfer | ....... | B62D 21/10 296/204 |
| 2002/0179353 A1* | 12/2002 | Robinson | ........... | B62D 25/2072 180/69.1 |
| 2004/0084924 A1* | 5/2004 | Albright | .................. | B60J 5/108 296/50 |

(Continued)

*Primary Examiner* — Erez Gurari
(74) *Attorney, Agent, or Firm* — Armstrong Teasdale LLP

(57) ABSTRACT

A skid plate for use with a vehicle. The skid plate includes a body portion including a front edge and a rear edge, and at least one protective wall extending from the front edge of the body portion. The at least one protective wall includes a first end and a second end, and the at least one protective wall is contoured such that the first end is defined at the front edge and the second end is positioned a distance from the front edge.

20 Claims, 3 Drawing Sheets

(56) References Cited

U.S. PATENT DOCUMENTS

| | | | | |
|---|---|---|---|---|
| 2008/0258506 | A1* | 10/2008 | Egawa | B62D 25/2036 296/204 |
| 2009/0091101 | A1* | 4/2009 | Leonard | B60G 3/20 280/638 |
| 2009/0091159 | A1* | 4/2009 | Gerish | B21D 53/88 296/193.07 |
| 2009/0242299 | A1* | 10/2009 | Takasaki | B60K 1/04 180/68.5 |
| 2010/0143695 | A1* | 6/2010 | Ogawa | B29C 51/004 428/306.6 |
| 2010/0237659 | A1* | 9/2010 | Ishigame | B62D 21/157 296/204 |
| 2011/0209937 | A1* | 9/2011 | Belzile | B60K 11/00 180/291 |
| 2012/0104793 | A1* | 5/2012 | Danielson | B62D 29/046 296/181.1 |
| 2013/0026797 | A1* | 1/2013 | Onodera | B62D 35/02 296/204 |
| 2013/0264839 | A1* | 10/2013 | Stimel, Jr. | B29C 41/08 296/39.3 |
| 2014/0329125 | A1* | 11/2014 | Miyanaga | B60R 13/0861 429/100 |
| 2014/0332292 | A1* | 11/2014 | Gopalsamy | E02F 9/24 180/9.42 |
| 2014/0353956 | A1* | 12/2014 | Bjerketvedt | B60N 3/06 280/756 |
| 2015/0048607 | A1* | 2/2015 | Patelczyk | B62D 25/12 280/770 |
| 2015/0061275 | A1* | 3/2015 | Deckard | B60G 21/055 280/788 |
| 2015/0239412 | A1* | 8/2015 | Altemeier | B60R 9/06 280/770 |
| 2015/0343900 | A1* | 12/2015 | Schlangen | B60G 3/20 180/247 |
| 2015/0353136 | A1* | 12/2015 | Kramer | B62D 21/11 296/204 |
| 2016/0129940 | A1* | 5/2016 | Patberg | B62D 35/02 296/187.08 |
| 2016/0332668 | A1 | 11/2016 | Pienkohs et al. | |
| 2017/0066483 | A1 | 3/2017 | Apostolico | |
| 2018/0086388 | A1* | 3/2018 | Dupper | B62D 25/2072 |

* cited by examiner

SKID PLATE AND UNDERBODY ASSEMBLY FOR USE WITH AN OFF-ROAD VEHICLE

BACKGROUND

The field of the present disclosure relates generally to motor vehicles and, more specifically, to an underbody protection system for use with an off-road vehicle.

At least some known off-road vehicles, such as all-terrain vehicles and utility vehicles, have a skid plate secured to its underside to protect underbody components from damage. For example, off-road vehicles may be susceptible to damage from the ground, rocks, stumps, or the like during use of the vehicle. Known skid plates are typically mounted to the underbody of the vehicle, such that the skid plate is oriented horizontally relative to the ground. During use, and as the vehicle traverses uneven terrain, an edge of the skid plate may become a catch point for portions of the terrain or debris from the surrounding environment. If the edge of the skid plate becomes a catch point, the skid plate may undesirably become detached from the vehicle, which may result in damage to not only the skid plate but also to the vehicle frame or body. In addition, the edge of the skid plate may become spaced from the remainder of the vehicle, thereby allowing debris to become lodged between the skid plate and the underbody components of the vehicle.

BRIEF DESCRIPTION

In one aspect, a skid plate for use with a vehicle is provided. The skid plate includes a body portion including a front edge and a rear edge, and at least one protective wall extending from the front edge of the body portion. The at least one protective wall includes a first end and a second end, and the at least one protective wall is contoured such that the first end is defined at the front edge and the second end is positioned a distance from the front edge.

In another aspect, an off-road vehicle is provided. The off-road vehicle includes a frame and a skid plate coupled to the frame. The skid plate includes a body portion including a front edge and a rear edge, and at least one protective wall extending from the front edge of the body portion. The at least one protective wall includes a first end and a second end, and the at least one protective wall is contoured such that the first end is defined at the front edge and the second end is positioned a distance from the front edge.

In yet another aspect, an underbody assembly for use with an off-road vehicle is provided. The underbody assembly includes a skid plate and a floor protector. The skid plate includes a body portion including a front edge and a rear edge, and at least one protective wall extending from the front edge of the body portion, wherein the at least one protective wall is oriented substantially perpendicularly relative to the body portion. The floor protector is contoured to define a wheel well of the off-road vehicle, wherein the floor protector includes a bottom end configured to mate with the at least one protective wall of the skid plate.

DETAILED DESCRIPTION

The embodiments described herein relate generally to an underbody protection system for use with an off-road vehicle. More specifically, the underbody protection system described herein includes a skid plate having a protective wall extending from a front edge of the skid plate. The protective wall is oriented substantially vertically when the skid plate is coupled to the vehicle such that debris directed towards the underbody of the vehicle is restricted from impinging the chassis of the vehicle, and such that a top edge of the skid plate is substantially prevented from acting as a catch point for the skid plate. In one embodiment, the protective wall of the skid plate is integrated with a floor protector within a wheel well of the vehicle. Integration of the protective wall with the floor protector further facilitates protecting the underbody of the vehicle from damage. As such, the system, assembly, and components thereof, described herein facilitate providing increased protection to the underbody of an off-road vehicle, and facilitate reducing potential damage to the skid plate by reducing the likelihood that the skid plate is caught on uneven terrain and/or detached from the vehicle.

Figure 1:
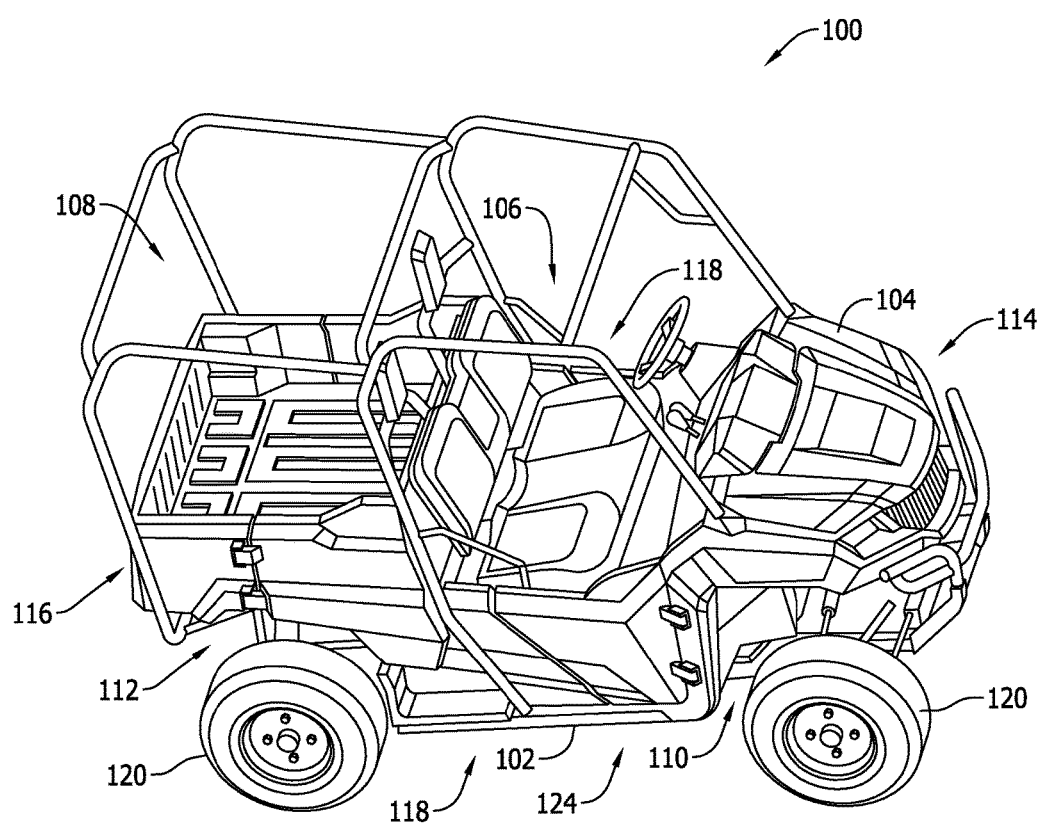
FIG. 1 is a perspective view of an exemplary utility vehicle (UTV)

FIG. 1 is a perspective view of an exemplary off-road vehicle, such as a utility vehicle (UTV) 100. In the exemplary embodiment, UTV 100 includes a frame 102 and a body 104 supported by frame 102. Body 104 defines a passenger compartment 106, a utility bed 108, a front wheel well 110, and a rear wheel well 112. Body 104 further defines a front end 114, a rear end 116, and a pair of sides 118 of UTV 100. UTV 100 also includes wheels 120 that are positioned within front wheel well 110 and rear wheel well 112, and that are connected to, and rotatable about, frame 102. In an alternative embodiment, UTV 100 does not include utility bed 108. As will be explained in further detail below, an underbody 124 of UTV 100 may be susceptible to damage from debris and rough terrain as UTV traverses the rough terrain.

Figure 2:
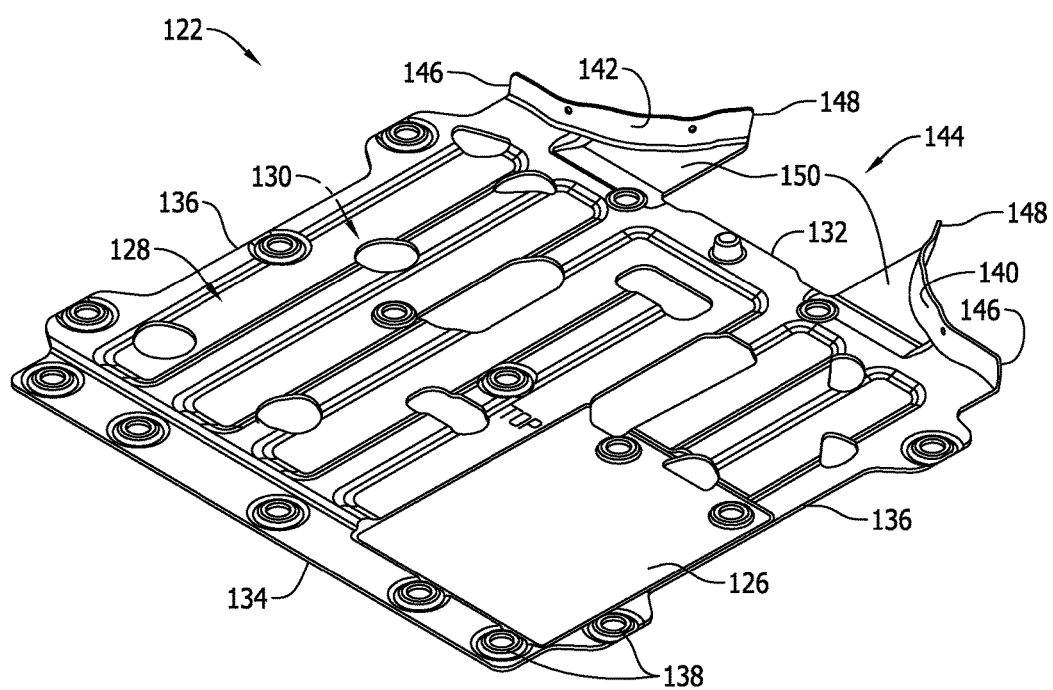
FIG. 2 is a perspective view of an exemplary skid plate that may be used with the UTV shown in FIG. 1.

FIG. 2 is a perspective view of an exemplary skid plate 122 that may be used with UTV 100 (shown in FIG. 1). More specifically, skid plate 122 may be positioned to facilitate protecting an underbody 124 (shown in FIG. 1) of UTV 100 from damage, such as by being coupled to frame 102 (shown in FIG. 1). In the exemplary embodiment, skid plate 122 includes a body portion 126 having an interior side 128 and an exterior side 130. Body portion further includes a front edge 132, a rear edge 134, and a pair of side edges 136. Body portion 126 is substantially planar and has a plurality of mounting holes 138 defined therein. In one embodiment, skid plate 122 is mounted to frame 102 (shown in FIG. 1) with fasteners (not shown) inserted through the plurality of mounting holes 138.

Skid plate 122 further includes at least one protective wall extending from front edge 132 of body portion 126, and oriented substantially perpendicularly relative to body portion 126. More specifically, skid plate 122 includes a first protective wall 140 and a second protective wall 142 extending from front edge 132 of body portion 126. First protective wall 140 and second protective wall 142 are spaced apart from each other such that a gap 144 is defined therebetween. Thus, as will be explained in further detail below, gap 144 is sized to enable first protective wall 140 and second protective wall 142 to extend along, and follow the contours of, frame 102 in front end 114 of UTV 100.

In the exemplary embodiment, first protective wall 140 and second protective wall 142 both include a first end 146 and a second end 148. First protective wall 140 and second protective wall 142 are each contoured such that each first end 146 is defined at front edge 132 of body portion 126, and such that each second end 148 is positioned a distance from front edge 132. For example, first protective wall 140 and second protective wall 142 have a substantially arcuate profile. In addition, first protective wall 140 and second protective wall 142 are oriented such that second ends 148 of first protective wall 140 and second protective wall 142 are positioned a lesser distance from each other than first ends 146 of first protective wall 140 and second protective wall 142. As such, first protective wall 140 and second protective wall 142 are contoured to at least partially conform to the shape of frame 102, and to facilitate limiting encroachment of skid plate 122 into front wheel well 110 (shown in FIG. 1).

In one embodiment, skid plate 122 further includes a connecting member 150 extending between first protective wall 140 and front edge 132, and between second protective wall 142 and front edge 132. Connecting member 150 is substantially co-planarly aligned with body portion 126. Thus, connecting member 150 provides additional underbody protection to frame 102, and facilitates increasing the rigidity of first protective wall 140 and second protective wall 142, especially at second ends 148 thereof.

Figure 3:
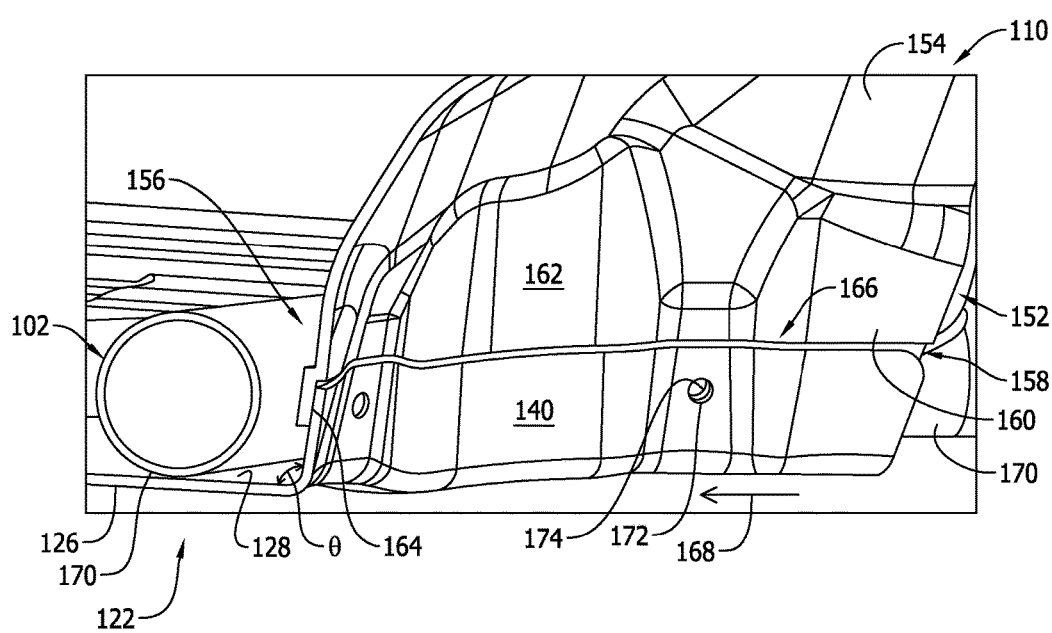
FIG. 3 is a partial cutaway view of a wheel well of the UTV shown in FIG. 1, at least partially defined by an exemplary underbody assembly.

FIG. 3 is a partial cutaway view of front wheel well 110 of UTV 100 (shown in FIG. 1), at least partially defined by an exemplary underbody assembly 152. In the exemplary embodiment, underbody assembly 152 includes skid plate 122 and at least one floor protector 154 coupled to skid plate 122. Floor protector 154 includes a bottom end 156 that mates with one of first protective wall 140 and second protective wall 142 when underbody assembly 152 is mounted to UTV 100. More specifically, floor protector 154 is contoured to define front wheel well 110 on a passenger side of UTV 100, and for mating with first protective wall 140. While only front wheel well 110 on the passenger side of UTV 100 is shown in FIG. 3, in some embodiments, UTV 100 includes a second floor protector (not shown) in the front wheel well on a driver side of UTV 100 for mating with second protective wall 142. In such embodiments, the second floor protector is a mirror image of floor protector 154, in that the second floor protector is contoured in a similar manner as floor protector 154, but is adapted to be positioned within the front driver side wheel well. First protective wall 140 and floor protector 154 will be described in more detail below, but it should be understood that the following description is applicable to second protective wall 142 and the second floor protector.

In the exemplary embodiment, bottom end 156 of floor protector 154 has an indent 158 defined therein for receiving first protective wall 140 therein. For example, indent 158 has a depth that is substantially equal to a thickness of first protective wall 140. Thus, a top edge 160 of first protective wall 140 is substantially flush with a surface 162 of floor protector 154, thereby facilitating reducing the likelihood that top edge 160 of first protective wall 140 will become a catch point for debris or uneven terrain while UTV 100 is in use. In addition, indent 158 defines a mating surface 164 oriented to couple against first protective wall 140 such that a seam 166 defined between first protective wall 140 and bottom end 156 of floor protector 154 is substantially sealed by mating surface 164. As such, any debris directed towards underbody assembly 152 in a longitudinal direction 168 (a direction that is oriented opposite to the direction of travel of UTV 100) is restricted from passing through seam 166 and impinging against underbody 124.

In one embodiment, first protective wall 140 is oriented obliquely relative to body portion 126. For example, first protective wall 140 is oriented at an angle θ greater than 90 degrees, more specifically, defined within a range between about 90 degrees and about 100 degrees and, even more specifically, defined within a range between about 95 degrees and about 100 degrees. As such, first protective wall 140 is oriented to facilitate directing debris downward and away from underbody 124 of UTV 100. In addition, orienting first protective wall 140 obliquely relative to body portion 126 provides a manufacturing advantage, such as when forming skid plate 122 from thermoplastic material in a mold, for example. In some embodiments, bottom end 156 of floor protector 154 is also oriented obliquely relative to body portion 126. More specifically, bottom end 156 is oriented at the same angle relative to body portion 126 as first protective wall 140. As such, bottom end 156 is contoured for flush engagement with first protective wall 140, and provides additional surface area for directing debris downward and away from underbody 124 of UTV 100.

As noted above, first protective wall 140 is shaped to follow the contours of frame 102 in front end 114 (shown in FIG. 1) of UTV 100. In the exemplary embodiment, frame 102 includes at least one frame member 170 that extends between front end 114 and one of sides 118 of UTV 100. Thus, when skid plate 122 is coupled to frame 102 using the plurality of mounting holes 138 (shown in FIG. 2) defined in predetermined locations on body portion 126, skid plate 122 is positioned relative to frame 102 such that first protective wall 140 extends along the at least one frame member 170. Skid plate 122 is also oriented relative to frame 102 when coupled thereto such that interior side 128 faces frame 102 and such that first protective wall 140 is oriented to extend substantially vertically upward. Skid plate 122 is also positioned relative to frame 102 such that at least a portion of the at least one frame member 170 is positioned between body portion 126 and first protective wall 140. That is, first protective wall 140 is positioned longitudinally forward of the at least one frame member 170 to facilitate blocking debris from impinging against the at least one frame member 170.

In some embodiments, first protective wall 140 is configured to couple to the at least one frame member 170 with a fastener (not shown). More specifically, first protective wall 140 has a first fastener hole 172 defined therein and bottom end 156 of floor protector 154 has a second fastener hole 174 defined therein. First fastener hole 172 and second fastener hole 174 are configured to align when bottom end 156 is mated with first protective wall 140. As such, first protective wall 140 and floor protector 154 are coupled to frame 102 at a common mounting point.

This written description uses examples to disclose various embodiments, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A skid plate for use with a vehicle, the skid plate comprising:

a body portion comprising a front edge and a rear edge; and at least one protective wall extending from said front edge of said body portion, wherein said at least one protective wall comprises a first end and a second end, said at least one protective wall contoured such that said first end is defined at said front edge and said second end is positioned a distance from said front edge, wherein said at least one protective wall is obliquely oriented relative to said body portion, and comprises a first protective wall and a second protective wall spaced from said first protective wall such that a gap is defined therebetween.

2. The skid plate in accordance with claim 1, wherein said first protective wall and said second protective wall are oriented such that second ends of said first protective wall and said second protective wall are positioned a lesser distance from each other than first ends of said first protective wall and said second protective wall.

3. The skid plate in accordance with claim 1, wherein said at least one protective wall is contoured to have a substantially arcuate profile.

4. The skid plate in accordance with claim 1 further comprising a connecting member extending between at least said second end of said at least one protective wall and said front edge of said body portion.

5. The skid plate in accordance with claim 1, wherein said body portion is substantially planar.

6. The skid plate in accordance with claim 4, wherein said connecting member is substantially co-planarly aligned with said body portion.

7. The skid plate in accordance with claim 1, wherein said at least one protective wall is oriented at an angle greater than 90 degrees relative to said body portion.

8. An off-road vehicle comprising:
a frame; and
a skid plate coupled to said frame, said skid plate comprising:
a body portion comprising a front edge and a rear edge; and
at least one protective wall extending from said front edge of said body portion, wherein said at least one protective wall comprises a first end and a second end, said at least one protective wall contoured such that said first end is defined at said front edge and said second end is longitudinally forward from said front edge.

9. The off-road vehicle in accordance with claim 8, wherein the off-road vehicle has a front end and at least one side, said frame comprising at least one frame member configured to extend between the front end and the at least one side, said skid plate positioned relative to said frame such that said at least one protective wall extends along said at least one frame member.

10. The off-road vehicle in accordance with claim 9, wherein said at least one protective wall is configured to couple to said at least one frame member with a fastener.

11. The off-road vehicle in accordance with claim 9, wherein said skid plate is positioned relative to said frame such that at least a portion of said at least one frame member is positioned between said body portion and said at least one protective wall.

12. The off-road vehicle in accordance with claim 8 further comprising a floor protector contoured to define a wheel well of the off-road vehicle, wherein said floor protector comprises a bottom end configured to mate with said at least one protective wall of said skid plate.

13. The off-road vehicle in accordance with claim 12, wherein said at least one protective wall and said floor protector are coupled to said frame at a common mounting point.

14. The off-road vehicle in accordance with claim 8, wherein said at least one protective wall is oriented to extend substantially vertically upward when said skid plate is coupled to said frame.

15. An underbody assembly for use with an off-road vehicle, the underbody assembly comprising:
a skid plate comprising:
a body portion comprising a front edge and a rear edge; and
at least one protective wall extending from said front edge of said body portion, wherein said at least one protective wall is oriented substantially perpendicularly relative to said body portion; and
a floor protector contoured to define a wheel well of the off-road vehicle, wherein said floor protector comprises a bottom end configured to mate with said at least one protective wall of said skid plate.

16. The underbody assembly in accordance with claim 15, wherein said bottom end of said floor protector has an indent defined therein configured to receive said at least one protective wall.

17. The underbody assembly in accordance with claim 16, wherein said indent defines a mating surface oriented to couple to said at least one protective wall such that a seam defined between said at least one protective wall and said bottom end of said floor protector is sealed by said mating surface.

18. The underbody assembly in accordance with claim 16, wherein said indent has a depth substantially equal to a thickness of said at least one protective wall.

19. The underbody assembly in accordance with claim 15, wherein said at least one protective wall has a first fastener hole defined therein and said bottom end of said floor protector has a second fastener hole defined therein, said first fastener hole and said second fastener hole configured to align when said bottom end is mated with said at least one protective wall.

20. The underbody assembly in accordance with claim 15, wherein said bottom end of said floor protector is oriented at the same angle relative to said body portion as said at least one protective wall.

* * * * *